(12) United States Patent
Pichel

(10) Patent No.: US 7,290,806 B2
(45) Date of Patent: Nov. 6, 2007

(54) ASSEMBLY FIXTURE

(75) Inventor: Sacha Pichel, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 538 days.

(21) Appl. No.: 10/309,232

(22) Filed: Dec. 4, 2002

(65) Prior Publication Data

US 2003/0103807 A1   Jun. 5, 2003

(30) Foreign Application Priority Data

Dec. 5, 2001   (DE) ................ 101 59 667

(51) Int. Cl.
   *F16L 25/00* (2006.01)
(52) U.S. Cl. .................. 285/421; 285/412; 403/370
(58) Field of Classification Search ............ 285/421, 285/412, 368, 415; 403/369, 370
   See application file for complete search history.

(56) References Cited

U.S. PATENT DOCUMENTS

| | | | | |
|---|---|---|---|---|
| 2,592,060 A | * | 4/1952 | Oulianoff | 285/363 |
| 2,768,847 A | * | 10/1956 | Peyrin et al. | 285/368 |
| 2,809,057 A | * | 10/1957 | Mceachern | 285/421 |
| 4,621,844 A | * | 11/1986 | Kipp et al. | 285/421 |
| 4,652,021 A | * | 3/1987 | Pido | 285/421 |
| 5,123,771 A | * | 6/1992 | Okuno | 403/369 |
| 6,074,122 A | * | 6/2000 | Krell, Jr. | 403/370 |
| 6,099,198 A | | 8/2000 | Kotzur et al. | |
| 6,299,221 B1 | * | 10/2001 | Chaniot et al. | 285/368 |
| 6,543,818 B2 | * | 4/2003 | Leman et al. | 285/412 |

FOREIGN PATENT DOCUMENTS

| | | |
|---|---|---|
| DE | 193242 | 8/1906 |
| DE | 1009638 | 6/1957 |
| DE | 2300971 | 1/1974 |
| DE | 4132740 | * 4/1993 |
| DE | 19728779 | 1/1999 |
| GB | 2095792 | 10/1982 |

OTHER PUBLICATIONS

JP 374629, Patent Abstracts of Japan, vol. 15, No. 239.

* cited by examiner

*Primary Examiner*—David Bochna
(74) *Attorney, Agent, or Firm*—Timothy J. Klima

(57) ABSTRACT

An assembly fixture for the separable connection of a first component 1 and a second component 2, the first component 1 having an essentially cylindrical end-face recess 3, with the second component 2 having an essentially cylindrical protrusion 4 which fits into the recess 3, with the protrusion 4 of the second component 2 being conical at a side opposite the cylindrical side, with the first component 1 being provided with a conical face at a side facing the cylindrical side of the recess 3, and with a conical clamping body 5 which, together with the protrusion 4 of the second component 2, can be fitted into the recess 3 of the first component 1 and clamped against the first component 1.

20 Claims, 1 Drawing Sheet

ASSEMBLY FIXTURE

This application claims priority to German Patent Application DE10159667.7 filed Dec. 5, 2001, the entirety of which is incorporated by reference herein.

BACKGROUND OF THE INVENTION

This invention relates to an assembly fixture for the separable connection of a first component with a second component. More particularly, this invention relates to an assembly fixture for the coupling and connection of shafts or similar parts in gas turbines and in the gas turbine industry.

Assembly fixtures of the type described are known in a great variety of designs. A first method of joining shafts or similar parts to form one piece is by welding or riveting, for example.

In the case of separable assembly fixtures, as the one described herein, the use of threaded connections is known in which bolts are passed through annular flanges, for example. In addition, the mating faces of the flanges can be provided with a structure, thus creating a positive connection between the mating components and relieving the bolts of shear load during the transmission of torques.

These designs incur high effort and costs in terms of both manufacture and assembly. Furthermore, impediments exist as to the simple and accurate centering and location of the components.

A further disadvantage of the known designs lies in the fact that slip and play can occur when torsion and bending moments are transmitted.

Still another disadvantage with these designs is that ease and repeatability of component assembly with constant results cannot safely be guaranteed. Therefore, the use of curvic couplings or, alternatively, smooth interference-fit flanges known as spigots was proposed. Also, shaft connections of the conical type have been described.

While curvic couplings essentially satisfy the requirements, they are very complicated and costly to manufacture. Due to limited friction, smooth interference-fit flanges (spigots) only lend themselves for the transmission of low torques. In addition, spigots involve a relatively high assembly effort to ensure the correct location of the required interference fit, in particular due to the need for special tooling, such as presses and ovens.

The known conical designs, while being self-centering, involve additional positional tolerances both axially and linearly and do not provide for reproducible assembly results. In addition, the self-locking effect of the friction cone can impede disassembly.

In the case of cone-type connections, systems are known in which, for example, a smooth, cylindrical shaft is used, onto which the component to be attached is installed. This component is provided with a cone on the recess or hole which faces the shaft. For attachment, a ring cone is clamped between the component and the shaft. A weight and space-saving connection of shafts, in particular hollow shafts, is virtually impossible with this system.

In another design, it was proposed to provide one of the two components with a conical recess into which the cone of the other part is forced. However, this design may entail problems in terms of centering and axial alignment. Furthermore, manufacturing inaccuracies can create problems in terms of accuracy and reproducibility of the assembly.

BRIEF SUMMARY OF THE INVENTION

In a broad aspect, the present invention provides an assembly fixture for the separable connection of parts, in particular shafts, which combines precise relative positioning of the components and ease of disassembly with simple design, inexpensive production and easy assembly.

It is a particular object of the present invention to provide a solution to the above problems with the assembly fixture described herein, with further objects and advantages of the present invention being described below.

The present invention accordingly provides a first component with an essentially cylindrical end-face recess into which a protrusion of a second component can be inserted. This protrusion is also cylindrical, at least as far as its functional surfaces are concerned. This arrangement enables the two components to be assembled with each other precisely and with high accuracy of fit. This arrangement is further advantageous in that the relationship between the two components is established as with a smooth flange. Appropriate selection of the clearance between the cylindrical portion of the recess and the cylindrical portion of the protrusion enables the desired tolerances to be preset. In particular loose fit tolerances, which set during clamping, may here be selected. Thus, the design provides for excellent alignment of the two components both axially and radially. Also, assembly and disassembly are considerably facilitated.

The present invention further provides for at least one conical clamping body which is fitted between the first and the second component to retain these two components against each other. For this purpose, at least one component is provided with a conical surface, preferably on one side facing the cylindrical side of the recess, which mates with a corresponding surface of the second component.

Accordingly, the arrangement as per the present invention features a hold-down cone which is pressed against the conical mating faces of the first component and/or of the second component as clamping force is applied (tightening of the fastening bolts). Thus, the two components are retained and the contour of the protrusion of the second component is forced against the contour of the recess of the first component.

The present invention accordingly provides for location of the two components by the straight mating faces on the recess and on the protrusion, while the transmission of force is effected by the friction in the conical clamping body and by the interference fit created by tightening the clamping body.

Accordingly, the assembly fixture as per the present invention is of the self-centering type. The axial or linear fit is ensured by the design principle underlying the inventive assembly fixture, dispensing with any other design features.

Another important advantage of the present invention lies in the fact that both assembly and disassembly can be accomplished easily and without the need for complex tooling. In particular, assembly is repeatable ad libitum with constantly good results. Here, it is particularly important that minor manufacturing tolerances or wear in the area of the conical clamping body will neither impair the relative location of the two components nor compromise the transmission of torque.

In addition, the assembly fixture according to the present invention is characterized by low manufacturing costs and long life.

Depending on the design of the conical clamping body and the conical surfaces of the first and second component it is possible to provide a cone with self-locking effect which is capable of transmitting high torques, with torque transmission being unaffected by the clamping force of the bolts, which may decrease over the time or at certain temperature gradients, for example.

In a particularly favorable embodiment of the present invention, both the first and the second component are tubular. This form enables the bolts or threaded studs used for clamping the conical clamping body to be arranged on the inner of the components, with the result that the outer circumference is not at all, or not substantially, affected by the assembly fixture.

In accordance with the present invention, the clamping body may either be an annulus (closed ring) or consist of ring segments. Accordingly, several ring segments can be provided. This can be particularly favorable where difficult assembly conditions are encountered or space is confined.

It is particularly favorable if both the protrusion of the second component and the recess of the first component are provided with locating faces.

The provision of bolts or threaded studs for clamping together the first and the second component will, in particular, lower production costs and facilitate assembly. For this purpose, both a flange of the first component and the clamping body can be provided with holes for the passage of the bolts or threaded studs. Depending on the direction of assembly, either the flange or the clamping body may be provided with threaded holes. Apparently, nuts may additionally be provided for tightening the bolts or threaded studs.

BRIEF DESCRIPTION OF THE DRAWINGS

This invention is more fully described in the light of the accompanying drawings showing a preferred embodiment. In the drawings.

DETAILED DESCRIPTION OF THE INVENTION

Figure 1:
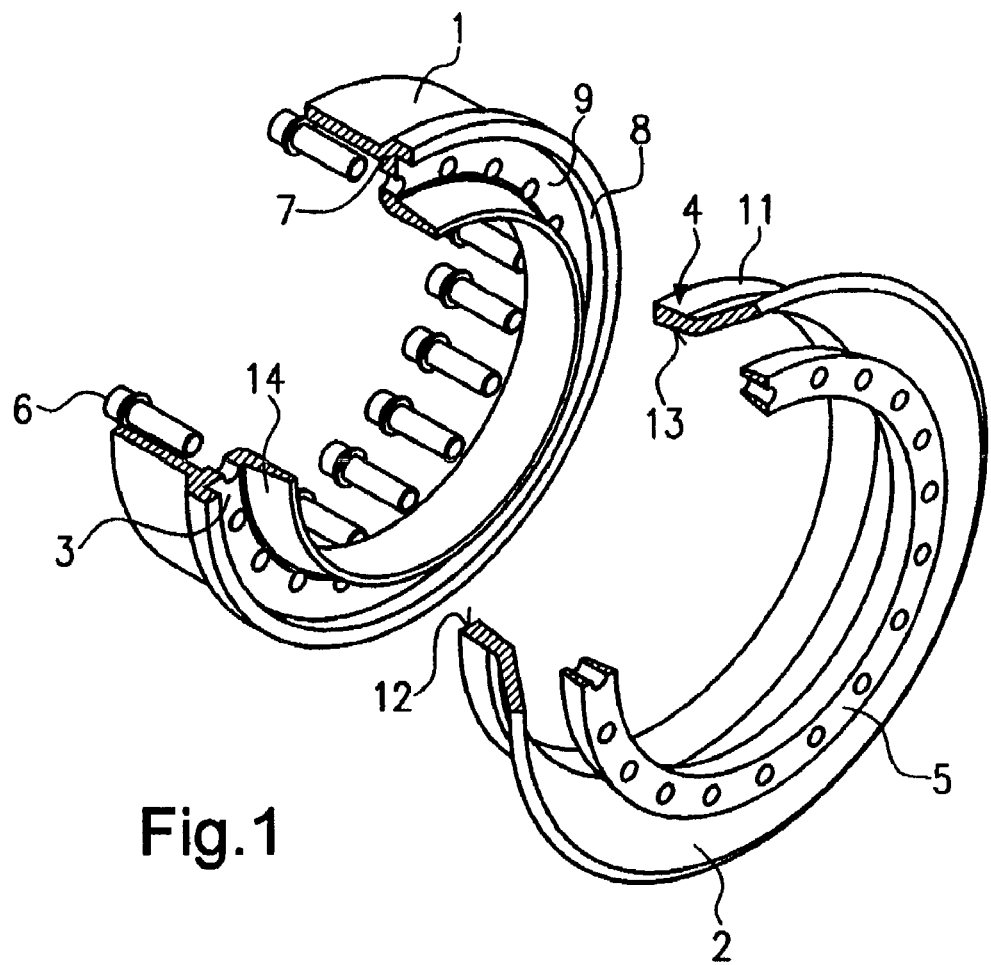
FIG. 1 is a perspective exploded view of the assembly fixture according to the present invention, partly in sectional view.
Figure 2:
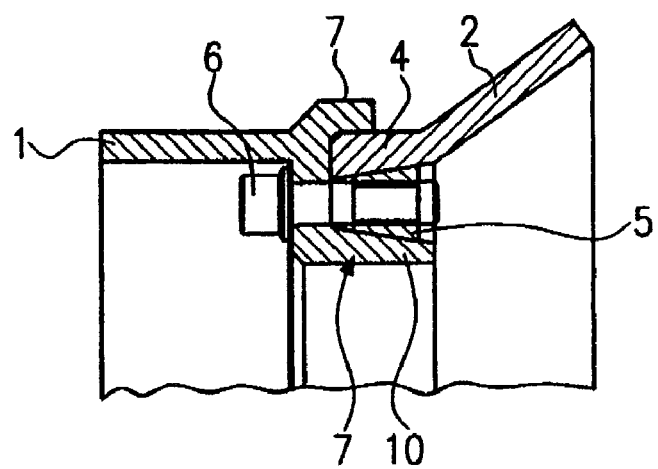
FIG. 2 is a partial sectional view of the assembly fixture shown in FIG. 1 in the assembled state.

For clarity of representation, FIGS. 1 and 2 show only a portion of the parts to be connected, these can have the form of hollow-shafts, for example.

The embodiment shows a first component 1 which has the form of a hollow shaft or a cylindrical design element and which is provided at its end face with a recess 3 in a flange 7, this flange being one-part with the first component 1. The recess has a radial locating face 8 and an axial locating face 9. As becomes apparent from FIG. 2, in particular, the flange 7 forms one part with an inner leg 10, this leg being provided with a conical face.

The second component 2 has a protrusion 4 which is tubular. The protrusion 4 features a radial locating face 11 and an axial locating face 12.

The radial locating face 11 of the second component 2 and the radial locating face 8 of the first component 1 are cylindrical.

On the side opposite the radial locating face 11, the protrusion is provided with a cylindrical or conical face 13. This corresponds with the cylindrical or conical face 14 of the leg 10 of the first component 1.

Between the two faces 13, 14 of which at least one is conical, a single or double-cone clamping body 5 can be inserted such that the cylindrical or conical faces of the clamping body 5 engage the two cylindrical or conical faces 13 and 14, respectively. The clamping body 5 can be clamped to the first component 1 and second component 2 with one or more bolts or threaded studs 6 which engage one or more bores in the clamping body 5 (see FIG. 2). The clamping body 5 thus ensures an axial relationship between the two components, transmits the corresponding frictional forces between the two components and presses the two radial locating faces 8, 11 against each other. It is contemplated that only one of the faces 13 and 14 need be conical as long as an annular receiving cavity having a wedge-shaped cross-section is respectively formed between the two faces to receive the clamping body 5 such that the clamping body 5 can frictionally engage between both faces 13 and 14 to couple the first component and the second component. Similarly, it is contemplated that only one engaging face of the clamping body 5 need be conical.

It is apparent that a plurality of modifications may be made to the embodiment here shown without departing from the inventive concept and that various aspects of the embodiment can be combined in different manners to create new embodiments.

What is claimed is:

1. An assembly fixture for the separable connection of a first component and a second component,
   the first component including an end-face recess having an essentially cylindrical portion and an essentially conical portion at a side facing the essentially cylindrical portion of the recess,
   the second component including a protrusion having an essentially cylindrical portion which fits into the recess of the first component, the protrusion of the second component having an essentially conical portion at a side opposite the essentially cylindrical portion, and
   a conical clamping body which, together with the protrusion of the second component, can be fitted into the recess of the first component to engage both of the essentially conical portions of the first component and the second component and can be clamped against the first component.

2. An assembly fixture in accordance with claim 1, wherein both the first component and the second component are tubular.

3. An assembly fixture in accordance with claim 2, wherein the clamping body is essentially annular.

4. An assembly fixture in accordance with claim 2, wherein the clamping body is a segmented ring.

5. An assembly fixture in accordance with claim 4, wherein both the protrusion of the second component and the recess of the first component have locating faces.

6. An assembly fixture in accordance with claim 5, wherein the first component and the second component can be clamped together with bolts.

7. An assembly fixture in accordance with claim 6, wherein the first component includes a flange, with the flange and the clamping body each including openings for the passage of the bolts.

8. An assembly fixture in accordance with claim 7, wherein the first component and the second component are hollow shafts.

9. An assembly fixture in accordance with claim 8 wherein the first component and the second component are separable hollow shaft sections of a gas turbine.

10. A coupling for separably joining a first component and a second component, comprising:

a generally annular recess positioned on the first component, the recess including a first engaging face and a second engaging face facing the first engaging face;

a generally annular protrusion positioned on the second component, the protrusion including a third engaging face and a fourth engaging face on an opposite side of the protrusion as the third engaging face such that when the generally annular protrusion is positioned in the generally annular recess, the first engaging face faces and engages the third engaging face and the second engaging face faces the fourth engaging face to form a generally annular receiving cavity having a wedge-shaped cross-section between the second face and the fourth face; and a clamping body having a wedge-shaped cross-section for fitting in the receiving cavity to engage the second face and the fourth face and clamping the first component to the second component;

wherein both of the second and fourth faces are conical.

11. A coupling as in claim 10, and further including:

a first axial locating face positioned on the first component; and a second axial locating face positioned on the second component;

,wherein the first axial locating face engages the second axial locating face to axially position the two components with respect to each other when the two components are coupled together.

12. A coupling as in claim 11, wherein both the first and third faces are generally cylindrical.

13. A coupling as in claim 12, wherein the clamping body is essentially annular.

14. A coupling as in claim 12, wherein the clamping body is a segmented ring.

15. A coupling as in claim 12, wherein the first component and the clamping body each include a plurality of openings for receiving a plurality of threaded fasteners respectively to clamp the clamping body to the first component.

16. A coupling as in claim 12, including the first component and the second component and wherein the first component and the second component are separable hollow shaft sections of a gas turbine.

17. A coupling as in claim 10, wherein both the first and third faces are generally cylindrical.

18. A coupling as in claim 10, wherein the clamping body is essentially annular.

19. A coupling as in claim 10, wherein the first component and the clamping body each include a plurality of openings for receiving a plurality of threaded fasteners respectively to clamp the clamping body to the first component.

20. A coupling as in claim 10, including the first component and the second component and wherein the first component and the second component are separable hollow shaft sections of a gas turbine.

* * * * *